United States Patent Office 3,832,343
Patented Aug. 27, 1974

---

3,832,343
PROCESS FOR OBTAINING AN EXTRACT OF ARNICA MONTANA
Bernard Majoie, Dijon, France, assignor to Societe de Recherches Industrielles S.O.R.I., Paris, France
No Drawing. Filed Sept. 21, 1972, Ser. No. 290,826
Claims priority, application France, Sept. 22, 1971, 7134172
Int. Cl. C07g 17/00
U.S. Cl. 260—236.5
11 Claims

ABSTRACT OF THE DISCLOSURE

The invention provides a process for extracting *Arnica montana*, in which the plant is extracted with at least one solvent chosen from petroleum ether, diethyl ether, acetone, chloroform, ethanol, water and their mixtures, the resulting filtrate or filtrates are treated with methanol, and polar substances are removed by filtration after treatment of the solution obtained with ethyl acetate. The extract so obtained has activity in preventing the coagulation of blood.

---

The present invention relates to materials active in preventing the coagulation of blood, and to a process for obtaining such products from *Arnica montana*.

The medicinal properties of Arnica in the treatment of a large number of diverse illnesses and afflictions have been known from antiquity. Thus, one of the best-known applications of this medicinal plant is to resolve, by external usage, ecchymoses (haematomas) resulting from traumas; for this purpose, Arnica tincture forms part of the family medicine chest and is entered in the French Pharmacopoeia and in numerous foreign pharmacopoeias.

Certain people have considered using Arnica for resolving certain human blood tissue diseases through internal usage. In addition to its uses for the purpose of resolving blood clots, Arnica has been used in a large number of other afflictions. It would however be impossible to enumerate here all the attempted uses of Arnica.

However, though this medicine has been used greatly, it has also been very controversial. Thus, some authors denounce it as having a harmful effect on the heart and, at high doses, on the nervous system.

In any case, its current medicinal use is strictly limited to external usage as a wet or fatty composition to bruises, either by itself or in combination with other materials.

Certain investigators have attempted to isolate an active principle from Arnica. Thus, one has reported that he isolated a principle, which he calls Arnicine, from a concentrated infusion of Arnica flowers, by treating this infusion with animal charcoal. More recently, a second investigator has macerated Arnica flowers in petroleum ether and following a series of operations directed at purifying the maceration extract has arrived at a pure substance which he calls Arnisterine and which he claims to be the crystallisable part of the Arnicine of the preceding investigator. These investigators did not mention any pharmacodynamic properties of the substances which they obtained. More recently still, a process has been described for extracting from *Arnica montana* a medicine which appears to be an alkaloid and which has the property of increasing blood pressure. In no case has the chemical structure of the isolated principle been given (see, in particular, German Pat. No. 744,283 and Belgian Pat. No. 448,292 of Knoll A.G.). The process consists in treating the flowers of the plant with petroleum ether to remove the fatty constituents and the resins, of extracting the residue, after filtration, with water and of precipitating the impurities from the aqueous phase with an alcohol, the filtrate being evaporated to dryness and finally taken up in water, ether, and again water before being treated with an agent which precipitates the alkaloids.

According to the present invention, an extract of *Arnica montana* which can be used as a medicament, especially against haemostasis, is made by successive extractions with solvents of increasing polarity so as to isolate, amongst the extracts obtained, those which show beneficial properties and which do not display toxicity. This technique, which is amply illustrated below, has made it possible to define a process for the preparation of an extract which acts in particular on the coagulation of the blood and which differs from the extracts of the prior art. The process of the invention comprises, successively:

(1) Subjecting the flowers, the ground roots or the ground stems of the plant to at least one extraction with at least one solvent chosen from petroleum ether, diethyl ether, acetone, chloroform, ethanol, water and their mixtures;

(2) concentrating the solution so obtained to dryness *in vacuo*, dissolving the resulting residue in methanol at a temperature not below 40° C., and removing the insoluble matter by filtration at a temperature between 10 and 25° C.; and (3) treating the filtrate so obtained with ethyl acetate, removing the insoluble matter by filtration and concentrating the filtrate *in vacuo*.

Preferably, the extraction in stage (1) is carried out with 1 to 10 l. of solvent per 1 kg. of *Arnica montana*. Preferably also at stage (2) the residue is dissolved in 0.5 to 1.5 l. of methanol per kg. of *Arnica montana* originally extracted.

The ethyl acetate is used to remove, by precipitation, the polar substances which are of no interest. Preferably, between 0.5 and 3 l. of ethyl acetate is employed when treating the extract from an initial 1 kg. of plant.

In stage (1), several successive extractions can be carried out, the insoluble residue from each extraction being re-extracted with each new solvent. According to one characteristic of the invention, if it is desired to obtain a positive result in at least one of the tests A, B, C, D, E and F described later herein, it is necessary to carry out in stage (1) at least one extraction with a nonaqueous solvent and one extraction with water or an aqueous mixture.

According to a preferred embodiment, stage (1) is carried out by the so-called technique of solvents of increasing polarity, with petroleum ether, diethyl ether, acetone, chloroform, the ethanol-water azeotrope (95:5 by volume), a mixture of ethanol and water (60:40 by volume) and then distilled water, using, for 1 kg. of *Arnica montana*, 10 l. of petroleum ether followed by 8 to 9 l. of each of the other solvents.

It is possible, in particular, to stop after the extraction with diethyl ether, after the extraction with the ethanol-water azeotrope (95:5) or after the extraction with distilled water. In the first two cases, the filtrate is evaporated to dryness under reduced pressure and the residue is taken up in water so as only to retain the water-soluble substances. In the latter case, taking up the filtrate, which has been evaporated under reduced pressure, in water is not necessary but optional.

Taking up with water in Example 1 was carried out with an aqueous NaCl solution containing 2 to 10 g. of NaCl per litre, so as to arrive directly at the experimental conditions relevant to the selection tests.

According to another preferred embodiment of stage (1), 1 kg. of *Arnica montana* is extracted with 1 litre of ethanol-water azeotrope (95:5) and the mixture is then filtered. Thereafter, the filtrate is concentrated in vacuo and the concentrate is taken up with 1 litre of a water-chloroform mixture, the emulsion is then broken and the aqueous phase is decanted. Thereafter, the aqueous phase is concentrated to dryness in vacuo.

In this latter technique, the chloroform-water mixtures which can most advantageously be used are those which contain at least 10 volumes of water per 90 volumes of chloroform and at most 90 volumes of water per 10 volumes of chloroform.

For purifying, where necessary, the extract of *Arnica montana* obtained according to the process of the invention, the following method is advantageously employed:

The final residue obtained in stage (3) is dissolved in methanol (4 l. per 10–24 kg. of plant initially treated) and silica (2 kg.) is added; the resulting paste is dried and distributed over a column containing ethyl acetate and silica (4 kg.), and the column is then eluted with a methanol-ethyl acetate mixture (5:95).

Other advantages and characteristics of the invention will be better understood on reading, below, preparation examples which are in no way limiting but are given by way of illustration.

EXAMPLE 1

The extraction is carried out starting from an initial quantity of 10 kg. of flower heads of *Arnica montana*, conforming to the standards of various pharmacopoeias, more particularly the French Pharmacopoeia. After each extraction, the stated quantity taken up is subjected to an evaporation in vacuo under controlled conditions which are a function of the residual solvent from the preceding extraction.

The solvents used

These are the following, at the successive stages of extraction:

Redistilled technical petroleum ether (40/60 fraction)
Redistilled, peroxide-free, technical diethyl ether ($C_2H_5$—O—$C_2H_5$)
Redistilled technical acetone ($CH_3$—CO—$CH_3$)
Redistilled technical chloroform (CH—$Cl_3$)
Ethanol (azeotrope of 95% $CH_3$—$CH_2$—OH and 5% $H_2O$)
A methanol-water mixture (60:40) and
distilled water.

The extractions

The initial amounts, or the amounts taken up, are placed in the boat of a Tournaire extractor and are extracted for 48 hours for each extraction stage; at the end of this period, the extraction of soluble substances from the material is complete. The amount of material treated is 10 kg. and the volume of the solvent used is 100 l. in the case of the petroleum ether and 80 to 90 l. in the case of the other solvents.

The products

At each extraction stage, the solution contained in the flask of the extractor is evaporated in a controlled manner, either in a rotary evaporator in vacuo, or by spraying or lyophilisation at a controlled input temperature; the evaporation residues thus obtained constitute the starting materials for obtaining medicines possessing an effect on haemostasis. The amounts of the extraction residues from each of these stages are as follows:

Extraction stage with petroleum ether (residue IV)
Amount extracted: about 650 g.
Extraction stage with diethyl ether (residue V)
Amount extracted: about 125 g.
Extraction stage with acetone (residue VI)
Amount extracted: about 350 g.
Extraction stage with chloroform (residue VII)
Amount extracted: about 25 g.
Extraction stage with ethanol (residue VIII)
Amount extracted: about 650 g.
Extraction stage with methanol/water mixture (residue IX)
Amount extracted: about 1,150 g.
Extraction stage with water (residue X)
Amount extracted: about 350 g.

The tests, and their results 2 g. of each of the preceding residues are mixed with 25 ml. of physiological serum at a temperature below 50° C., and whilst stirring; the mixture obtained is filtered on filter paper and is centrifuged at 16,000 revolutions/minute; the soluble part thus obtained constitutes a stock solution which, together with its diluted versions, is subjected to a series of quantitative tests on human plasma in relative proportions of 1 to 9, the series comprising, in particular:

A: An anti-antiplasmin test.—The product is stated to be active if the time of coagulation of the exudate of plasma coagulated in its presence is significantly shortened compared to a reference sample, and if the product remains fibrinolytic on an Astrup plate in the presence of plasma.

B: A fibrinolysis test.—The product is stated to be active if the lacuna produced by lysis on an Astrup fibrin plate is greater than or equal to 25 mm.$^2$.

C: A platelet anti-agglutination test.—The product is stated to be active if the kinetics of platelet agglutination in the presence of A.D.P., collagen or adrenalin are significantly different from those of comparison samples.

D: An anti-thrombin test.—The product is stated to be active if the coagulation time is lengthened or if there is no coagulation at all when the blood is brought into contact with the product and if the thrombin time at various thrombin concentrations and various concentrations of products is significantly lengthened (on lyophilised plasma: no platelet interference).

Positive reactions to one of these four first tests indicate valuable properties from the point of view of haemostasis.

E: A fibrinogenolysis test.—The product is stated to be active if the plasma coagulation time is significantly increased in the presence of an excess of thrombin and if the addition of product significantly increases the coagulation time on coagulated plasma exudate.

F: A coagulation test.—The product is stated to be active if a lengthening of the coagulation time on complete blood, or the appearance of an "abnormal" clot, is observed.

The appearance of this "abnormal" clot results from the effects described, namely: fibrinolytic and anti-agglutinant platelet (?).

Only the residue X and the water-soluble fractions of the extraction residues IV, V, VI, VII, VIII and IX gave positive results, represented by the sign + in Table I below, the non-positive (sic) results being represented by the sign —. The results obtained with the extraction residues V' and VIII' have also been included in the said table, those residues having been prepared from water-soluble fractions of V and VIII, respectively, by chromatography on a silica column, elution with a methanol-ethyl acetate mixture (95:5) and concentration of the eluates in vacuo, as indicated above.

It can be seen from Table I that amongst the extracts with different solvents, only the water-soluble extracts from V (diethyl ether) and VIII (ethanol) the extract X (water) and the homologues V' and VIII' possess properties of value for haemostasis from a therapeutic point of view.

EXAMPLE 2

On following the procedure indicated in Example 1, but replacing the *Arnica montana* flowers by ground stems, extracts IV, V, VI, VII, VIII, IX, X, V' and VIII' were obtained, having the same properties as the extracts in Example 1, but in different proportions, namely:

Petroleum ether (residue IV): about 2000 g.
Diethyl ether (residue V): about 15 g.
Acetone (residue VI): about 800 g.
Chloroform (residue VII): about 25 g.
Ethanol (residue VIII): about 700 g.
Methanol/water (residue IX): about 450 g.
Water (residue X): about 650 g.

EXAMPLE 2 BIS

On following the procedure indicated in Example 1 but replacing the flowers of *Arnica montana* by ground stems of the plant, extracts IV, V, VI, VII, VIII, IX, X, V' and VIII' were obtained in proportions identical to those of Example 2. The qualitative tests applied to the extracts of Examples 2 and 2 bis did not show differences as compared to the extracts obtained from flower heads.

vacuo. 910 g. of a dry product hereafter referred to as N are obtained.

Purification of N

The residue of 910 g. is dissolved in 4 l. of methanol and 2 kg. of silica (silica CC4, sold by Mallinckrodt) are added to the solution. After homogenisation, the paste is dried in a rotary evaporator (?) flask under reduced pressure. Further, two columns are prepared with ethyl acetate and 4 kg. of Mallinckrodt silica CC4 per column. When these columns have thus been prepared, half the dried paste previously obtained is poured into each. The columns are then eluted continuously with a methanol-ethyl acetate (5:95) mixture and four fractions are collected:

G.

$F_1$, in the first 20 litres: dry material obtained after evaporation in vacuo _____ 78
$F_2$, in the next 80 litres: dry material obtained after evaporation in vacuo _____ 80
$F_3$, in the next 20 litres: dry material obtained after evaporation in vacuo _____ 53
$F_4$, in the next 20 litres: dry material obtained after evaporation in vacuo _____ 42

The purified product N consists of the combination of the solid substances obtained by drying the fractions $F_1$, $F_2$, $F_3$ and $F_4$. It displays three absorption bands at 208, 264 and 325 m$\mu$.

TABLE I

|  | IV[1] | V[1] | VI[1] | VII[1] | VIII[1] | IX[1] | X[2] | V'[3] | VIII'[3] |
|---|---|---|---|---|---|---|---|---|---|
| A Antiantiplasmin | − | + | − | − | − | − | − | + | + |
| C Antiagglutinant | − | + | + | + | + | + | − | + | + |
| D Antithrombin | − | − | − | − | − | + | − | − | − |
| B Fibrinolysis | − | + | − | + | + | − | − | + | + |
| E Fibrinogenolysis | − | − | − | − | − | − | + | + | + |
| F Coagulation of whole blood | − | + | − | + | − | − | + | + | + |

[1] Water-soluble fraction.
[2] Extraction residue taken up in water as indicated for the other water-soluble fractions.
[3] After purification of the water-soluble fractions on a column.

The most valuable therapeutic results are those which are positive to tests B and C.

Comparative toxicity

The use of *Arnica montana*, whether as a complete plant or a part thereof, flower heads, stems or roots, in the form of aqueous, aqueous-alcoholic or alcoholic extracts, for internal use is very controversial but numerous authors attribute to this form of use a toxic action on the heart and, at a high dose, on the nervous system.

The object of the present invention is to select the non-toxic parts which have a therapeutic action.

The action of the fractions V' and VIII' was compared to that of Arnica tincture (in accordance with the prescriptions of the French Pharmacopoeia, 1965 edition), using the water-soluble part of the dry extract.

The LD 0 in mice of fractions V' and VIII' is over 1,500 mg./kg. when injected peritoneally.

The LD 50 in mice of the aqueous fraction of the dry extract of *Arnica montana* tincture is about 450 mg./kg. when injected peritoneally.

EXAMPLE 3

The procedure indicated in Example 1 is followed, starting from 24 kg. of *Arnica montana* flowers. After successive extractions with petroleum ether, diethyl ether, acetone, chloroform and the ethanol-water (95:5) azeotrope, 1,850 g. of dry extract VIII are obtained.

This extract is taken up in water and filtered to remove the water-insoluble substances. The filtrate is then desiccated and dissolved in 20 l. of hot methanol (40° C.). After cooling the solution, the insoluble matter is filtered off. 20 l. of ethyl acetate are added to the filtrate thus obtained and the mixture is again filtered. The resulting filtrate is reduced to dryness by distilling the solvents in

EXAMPLE 4

10 kg. of *Arnica montana* flower heads are extracted with 10 litres of 95% strength ethyl alcohol. The alcoholic extract is concentrated under reduced pressure and taken up in 10 litres of a water-chloroform mixture (50:50). The emulsion formed is broken and the aqueous phase is decanted. The aqueous phase is concentrated in vacuo and the residue is dissolved in 12 volumes of hot methanol (40° C.).

After cooling, the insoluble matter is filtered off. An aliquot amount of ethyl acetate is added to the filtrate and the precipitate is filtered off. The operation is repeated once and the filtrate is brought to dryness under reduced pressure. A product denoted S is obtained, from which the polar products which are of no value have been removed.

The residue is taken up in 4 litres of methanol and 2 kg. of silica (Mallinckrodt silica $CC_4$) are added to the solution.

After homogenisation the paste is dried in a Rotavapor (? rotary evaporator) flask under reduced pressure. Further, 2 columns are prepared with ethyl acetate and 4 kg. of silica $CC_4$ per column.

Half the paste obtained above is poured into each column and the column is eluted with a methanol-ethyl acetate mixture (5–95). Four fractions are collected:

$F_1$ first 20 litres      $F_3$ next 20 litres
$F_2$ next 80 litres       $F_4$ last 20 litres.

Each fraction $F_1$, $F_2$, $F_3$ and $F_4$ is taken up in 20 times its weight of water and is filtered over a sterilising filter having a porosity of 40 m$\mu$. The activity of the purified product S, which corresponds to the activity of the product S is obtained by mixing the products of the four fractions $F_1$, $F_2$, $F_3$ and $F_4$. The purified product S displays three absorption bands: 208, 264 and 325 m$\mu$. 700 g. of S and 180 g. of S purified by chromatography are obtained from 10 kg. of flowers.

The products obtained according to the invention which have proved of the greatest value in therapy are the extracts N and S and the purified extracts resulting therefrom.

In therapy, the administration of at least one extract according to the invention at a therapeutically effective dose, combined with a physiologically tolerated vehicle, is recommended for affecting the coagulation of the blood.

The preferred extracts for affecting the coagulation of the blood are the extracts N and S of Examples 3 and 4, whether purified by chromatography or not.

I claim:

1. Process for obtaining an extract of *Arnica montana*, which comprises successively:
   (1) extracting the flowers, the ground roots or the ground stems of the plant at least once with at least one solvent chosen from petroleum ether, diethyl ether, acetone, chloroform, ethanol, water and their mixtures;
   (2) concentrating the solution or solutions so obtained to dryness *in vacuo*, dissolving the resulting residue in methanol at a temperature not below 40° C., and removing the insoluble matter by filtration at between 10 and 25° C.; and
   (3) treating the filtrate so obtained with ethyl acetate, removing the insoluble matter by filtration, and concentrating the filtrate *in vacuo*.

2. Process according to claim 1, in which in stage (1) each kg. of *Arnica montana* is treated with 1 to 10 litres of solvent.

3. Process according to claim 1, in which in stage (2) the residue from each kg. of Arnica extracted is dissolved in 0.5 to 1.5 litres of methanol.

4. Process according to claim 1, in which in stage (3) the filtrate from each kg. of Arnica extracted is treated with 0.5 to 3 litres of ethyl acetate.

5. Process according to claim 1, in which the *Arnica montana* is subjected to successive extractions with several solvents of which at least one is water or an aqueous medium.

6. Process according to claim 1, in which each kg. of *Arnica montana* is extracted with 10 litres of petroleum ether, the residue insoluble in petroleum ether is extracted with 8 to 9 litres of diethyl ether, and the filtrate is concentrated *in vacuo* and the residue thus obtained is taken up in water so as to remove, by filtration, the water-insoluble substances.

7. Process according to claim 1, in which
   (a) each kg. of *Arnica montana* is extracted with 10 litres of petroleum ether;
   (b) the residue insoluble in the petroleum ether is extracted with 8 to 9 litres of diethyl ether;
   (c) the residue insoluble in the diethyl ether is extracted with 8 to 9 litres of acetone;
   (d) the residue insoluble in the acetone is extracted with 8 to 9 litres of chloroform; and
   (e) the residue insoluble in the chloroform is extracted with 8 to 9 litres of ethanol-water azeotrope (95:5), the filtrates are concentrated *in vacuo* and the residue thus obtained is taken up in water so as to remove the water-insoluble substances.

8. Process according to claim 1, in which
   (a) each kg. of *Arnica montana* is extracted with 10 litres of petroleum ether;
   (b) the residue insoluble in the petroleum ether is extracted with 8 to 9 litres of diethyl ether;
   (c) the residue insoluble in the diethyl ether is extracted with 8 to 9 litres of acetone;
   (d) the residue insoluble in the acetone is extracted with 8 to 9 litres of chloroform;
   (e) the residue insoluble in the chloroform is extracted with 8 to 9 litres of ethanol-water azeotrope (95:5);
   (f) the residue insoluble in the ethanol-water azeotrope is extracted with 8 to 9 litres of an ethanol-water mixture (60:40); and
   (g) the residue insoluble in the ethanol-water (60:40) mixture is extracted with 8 to 9 litres of distilled water.

9. Process according to claim 1, in which
   (a) each kg. of *Arnica montana* is extracted with 1 litre of ethanol-water azeotrope (95:5) and the mixture is filtered;
   (b) the filtrate is concentrated *in vacuo* and the concentrate is then taken up in 1 litre of a water-chloroform mixture; and
   (c) the aqueous phase is separated and concentrated to dryness *in vacuo*.

10. *Arnica montana* extract obtained by the process of claim 1.

11. Process according to claim 1 wherein said extraction step of stage (1) is carried out in a series of separate extractions employing solvents of increasing polarity.

References Cited

C.A. 7: 44813s (1969) Dombrowicz et al.

Collection of Czechoslovak Chemical Communications 36: 2196–2197 (June 1971), Poplawski et al.

HENRY R. JILES, Primary Examiner

S. D. WINTERS, Assistant Examiner

U.S. Cl. X.R.

424—195; 260—236 R